United States Patent
Suzuki et al.

(10) Patent No.: US 6,863,514 B2
(45) Date of Patent: Mar. 8, 2005

(54) OPTICAL FIBER RECOATING DEVICE

(75) Inventors: Junichi Suzuki, Sakura (JP); Yoshinori Kanai, Sakura (JP); Manabu Fujisawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 158 days.

(21) Appl. No.: 10/268,579

(22) Filed: Oct. 10, 2002

(65) Prior Publication Data

US 2003/0077345 A1 Apr. 24, 2003

(30) Foreign Application Priority Data

Oct. 23, 2001 (JP) .......................... 2001-324670

(51) Int. Cl.⁷ ............................................. B29C 45/14
(52) U.S. Cl. ................................. 425/116; 249/114.1
(58) Field of Search .................... 425/116; 264/263; 249/114.1

(56) References Cited

U.S. PATENT DOCUMENTS

| | | | | |
|---|---|---|---|---|
| 4,091,062 A | * | 5/1978 | Nelson | .......................... 264/85 |
| 4,152,539 A | * | 5/1979 | Charlebois et al. | ....... 174/72 R |
| 4,270,021 A | * | 5/1981 | Gold | .......................... 174/84 R |
| 4,410,561 A | * | 10/1983 | Hart, Jr. | ....................... 427/513 |
| 5,022,735 A | | 6/1991 | Dahlgren | |
| 5,277,730 A | * | 1/1994 | Darsey et al. | ............... 156/158 |
| 6,688,870 B2 | * | 2/2004 | Shibata et al. | ............... 425/117 |

FOREIGN PATENT DOCUMENTS

| | | | |
|---|---|---|---|
| DE | 3508158 A1 | 9/1986 | |
| GB | 2 105 060 A1 | 3/1983 | |
| JP | 04347804 A | * 12/1992 | ............ G02B/6/24 |
| JP | 06148452 A | * 5/1994 | ............ G02B/6/255 |

* cited by examiner

*Primary Examiner*—Robert B. Davis
(74) *Attorney, Agent, or Firm*—Darby & Darby

(57) ABSTRACT

The present invention relates to an optical fiber recoating device, and to an improvement in the molds employed in this device. The optical fiber recoating device is provided for filling a recoating resin into molds, wherein semicircular mold grooves in molds into which the recoating resin is filled are longer than a bare fiber portion of an optical fiber, and an outer diameter of mold groove is larger than the outer diameter of semicircular sheath engaging grooves that engage a sheath of the optical fiber. As a result, a cylindrically shaped extending portion which extends to the sheath is formed to each end of the recoated sheath, so that joining strength of the recoated sheath is improved.

8 Claims, 12 Drawing Sheets

OPTICAL FIBER RECOATING DEVICE

BACKGROUND OF THE INVENTION

1. Field of the Invention

The present invention relates to an optical fiber recoating device for reapplying a resin coating to an area along an optical fiber where the sheath has been removed. More specifically, the present invention relates to an improvement in the molds employed in the device.

2. Description of the Related Art

In order to protect an optical fiber, it is necessary to reapply resin to an area (a bare fiber portion) where the sheath thereof has been removed, which can occur when connecting optical fibers using heat fusion, for example. In other words, the optical fiber must be recoated.

A number of devices have been proposed as conventional recoating devices. One example of these is a device of the type shown in FIGS. 5 through 7 (i.e., a mold-style device), in which recoating is performed by filling the recoating resin into a mold. Another example of a conventional device is shown in FIG. 8, in which a recoating resin that fills a die is applied to the optical fiber.

A recoating device 10 shown in FIGS. 5 and 6 has two upper and lower molds, 11A and 11B which are typically being made of light transmitting quartz glass. These molds 11A, 11B are provided between a base 12 and a lid 13 which is attached to the base 12 so as to permit opening and closing thereof. The recoating resin (typically a UV curable resin) is filled into respective semicircular mold grooves 16 of the molds 11A, 11B via resin filling ports 14, 15 which are formed in the lid 13 and upper mold 11B, and a resin filling route R which is formed in the upper mold 11B.

As shown in FIG. 6, the width of each mold groove 16 is designed to be longer than a bare fiber portion 1a of an optical fiber 1 which was joined using heat fusion for example.

Accordingly, when this optical fiber 1 is set in place in the respective mold grooves 16 of the molds 11A, 11B, a nearly closed cylindrical space is formed inside the mold grooves 16 around bare fiber portion 1a. The recoating resin is then filled into this space, forming a recoated sheath 2, i.e., a molded portion. Furthermore, UV light is radiated at this time by a resin curing means 17, such as a UV lamp, which is provided on the base 12 side for example, and then, curing of the resin can be promoted and the rapid recoating can be performed.

A recoating device 20 shown in FIG. 7 is an improved version of the above-described recoating device 10. This recoating device 20 has the same molds 11A, 11B, and a light blocking layer 18, consisting of a metal layer or the like, is provided on an abutting surface of each mold 11A, 11B at areas other than where mold groove 16 is located. As a result, areas other than the mold grooves 16 are not irradiated with UV light, so that resin curing can be prevented in areas where it is not necessary. Accordingly, it is possible to obtain an excellently formed recoated sheath.

A recoating device 30 shown in FIG. 8 has a die 31 used for the recoating resin and a resin curing means 32 such as a UV lamp or the like. An optical fiber 1 having a bare fiber portion 1a is held in a vertical orientation by upper and lower clamps 33 of the recoating device 30.

In this state, the die 31 is set in position at the bare fiber portion 1a, and the resin curing means 32 is set in position below the die 31. Furthermore, the recoating resin (UV curable resin) 3 which has been melted is supplied in the die 31 and the die 31 is raised.

As a result, a recoated sheath 2 of approximately the same diameter as the outer diameter of a sheath 1b of the fiber is gradually formed from below. The resin curing means 32 is also raised as the die 31 is raised, and the recoating resin 3 is gradually cured from below using UV light irradiation. In this way, the bare fiber portion 1a can be recoated.

However, as shown in FIG. 9, in the recoating device 10 shown in FIGS. 5 and 6, a problem that a sufficiently strong joining cannot be achieved between the recoated sheath 2 and sheath 1b (i.e., boundary area A), so that cracks, etc., may arise from boundary area A when the optical fiber is used after this recoating procedure arises.

For this reason, a method has been proposed for improving joining strength as shown in FIG. 10, wherein a small diameter part 1c is formed to the sheath 1b, and the recoating resin is filled over this area as well so as to form an extending part 2a to the recoated sheath 2.

However, in this method, there is an increase in the number of processing steps for the small diameter part 1c, which is troublesome and decreases productivity.

A method has also been proposed for obtaining a wide joining surface in the recoating device 10 shown in FIGS. 5 and 6, wherein the inner diameter of the cylindrical holes formed by the respective mold grooves 16 is designed to 20–30 $\mu$m larger than the outer diameter of the sheath 1b, and, as shown in FIG. 11, a thin film portion 2b which is 20–30 $\mu$m in thickness is formed on the end portions of recoated sheath 2.

However, in this method, it is difficult to accurately position the optical fiber 1 itself in the center of the cylindrical hole. Namely, as shown in FIG. 12, it is often the case that the thin film portion 2b is positioned eccentrically. When this occurs, the thin film portion is more prone to breaking, leading to cracking in the recoated sheath 2.

In the recoating device 20 shown in FIG. 7, it is possible to prevent the generation of thin film projections (burrs) 2c such as shown in FIG. 13 to portions of recoated sheath 2, since UV irradiation of unnecessary areas is prevented by the light blocking layer 18. However, in reality a small interval of space is unavoidably generated in the area between the inner surface of the cylindrical hole formed by the mold grooves 16 and the outer periphery of the sheath 1b. Moreover, since the light blocking layer 18 is not formed over the entire length to the ends of the respective mold grooves 16, it is difficult to prevent the formation of unnecessary thin film portion 2d as shown in FIG. 14. Furthermore, this thin film portion 2d becomes thinner approaching its ends and is not formed with a uniform shape. Thus, it easily peels and forms abnormal burrs, serving as a starting point for cracks in the recoated sheath 2.

In addition, in the case of the recoating device 30 shown in FIG. 8, it is difficult to form the outer diameter of the recoated sheath 2 to be uniform along its entire length. As a result, there are large variations in diameter, as shown in FIG. 15. For example, in a test sample using the optical fiber 1 in which the outer diameter of the sheath 1b was 0.25 mm, the maximum diameter portion $D_1$ at the upper end of the recoated sheath 2 was 0.31 mm, while the minimum diameter portion $D_2$ at the lower end of the recoated sheath 2 was 0.19 mm.

SUMMARY OF THE INVENTION

The present invention is conceived in view of the above-described circumstances and has as its objective the provision of a recoating device that resolves the problems encountered in the conventional art, through devising the design of the mold grooves in the molds employed in a mold-style recoating device.

The first aspect of the present invention is an optical fiber recoating device for recoating the bare fiber portion of an optical fiber by filling a recoating resin into molds, wherein the semicircular mold grooves in the molds into which the recoating resin has been filled are longer than the bare fiber portion of the optical fiber, and the outer diameter of the mold grooves is larger than the outer diameter of semicircular sheath engaging grooves that extend from either end of the mold grooves and engage the sheath of the optical fiber.

The second aspect of the present invention is an optical fiber recoating device according to the first aspect, wherein the mold grooves are in the range of 2–10 mm longer than the bare fiber portion of the optical fiber.

The third aspect of the present invention is an optical fiber recoating device according to the first or second aspect, wherein the outer diameter of the mold grooves are 0.03–0.13 mm larger than the outer diameter of the sheath of the optical fiber.

The fourth aspect of the present invention is an optical fiber recoating device according to any one of the first through third aspect, wherein a tapered portion consisting of a slanted surface is provided to each edge of the mold grooves.

The fifth aspect of the present invention is an optical fiber recoating device according to any one of the first through fourth aspect, wherein the molds are made of a light transmitting material.

The sixth aspect of the present invention is an optical fiber recoating device according to the fifth aspect, wherein a light blocking layer is provided to areas other than the mold grooves in the molds.

DETAILED DESCRIPTION OF THE PREFERRED EMBODIMENTS

Figure 1:
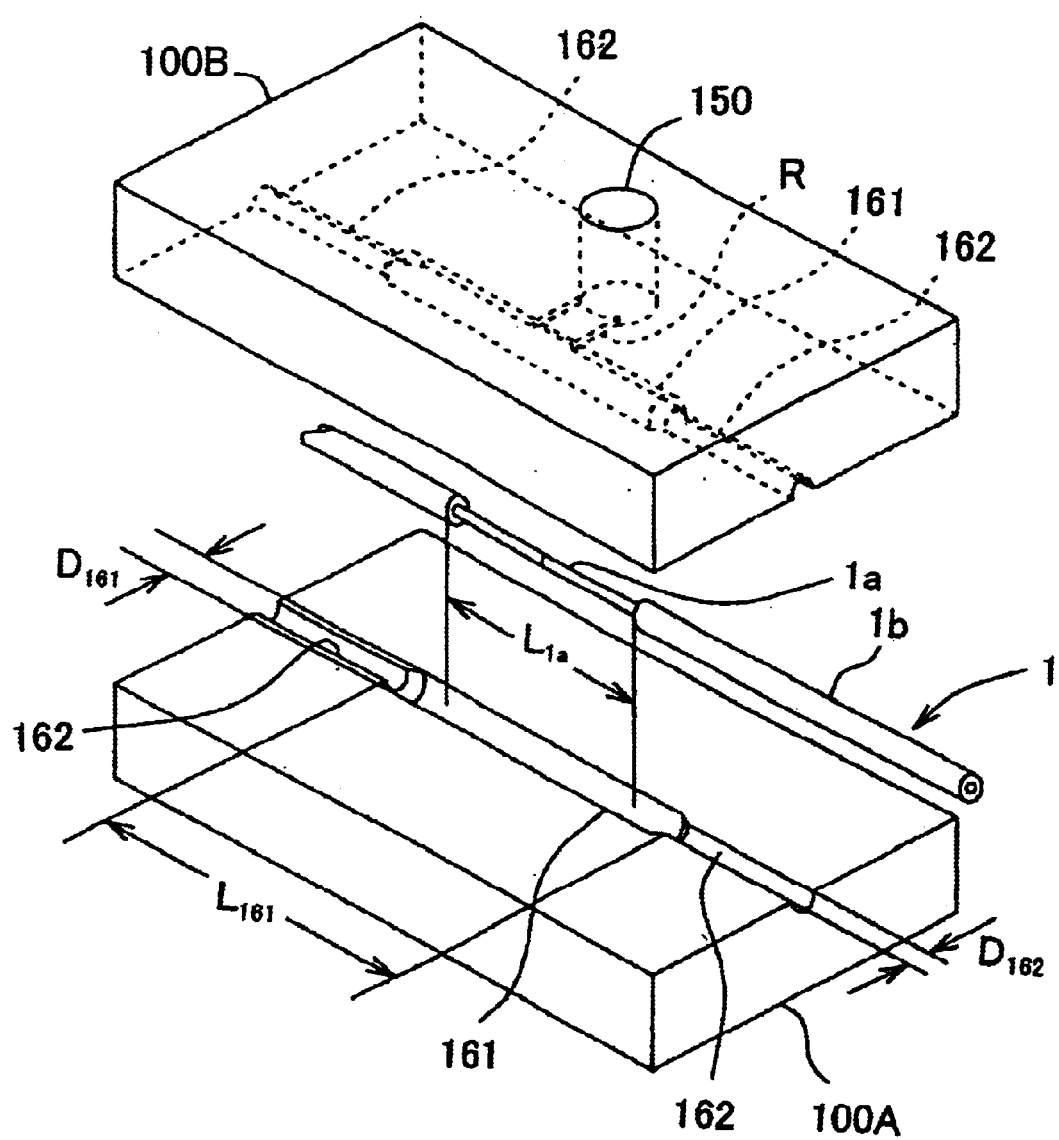
FIG. 1 is a schematic view showing the molds employed in the optical fiber recoating device according to the present invention.

FIG. 1 shows an example of the molds incorporated in the recoating device according to the present invention. Note that the overall structure of the recoating device of the present invention is not particularly restricted and may, for example, have the same structure as recoating device 10 shown in FIGS. 5 and 6.

The present invention's molds 100A, 100B are typically formed of a light transmitting material (quartz glass, etc.). A semicircular mold groove 161 through which the recoating resin is filled, and a semicircular sheath engaging groove 162 in which the sheath 1b of optical fiber 1 engages from either end of the mold groove 161, are formed at roughly the center of the abutting surface side (contact surface) of these molds. A resin filling port 150 and a resin filling route R are provided in the upper mold 100B as in the case of the recoating device 10. Note that the resin filling route R can also be provided in the lower mold 100A or in between the molds 100A, 100B.

Figure 2:
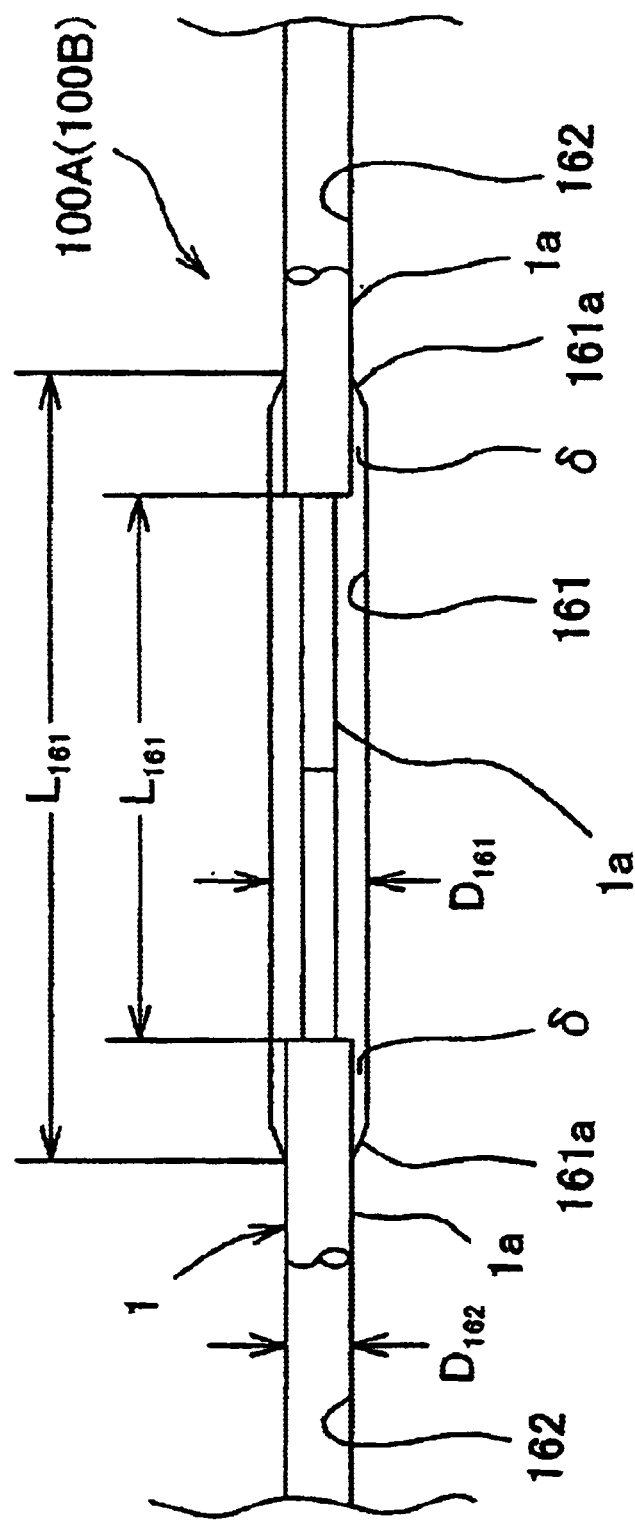
FIG. 2 is a view showing the abutting surfaces of the molds in FIG. 1.

In the molds 100A, 100B, as shown in FIGS. 1 and 2, the length $L_{161}$ of the mold groove 161 into which the recoating resin is filled is longer than the length $L_{1a}$ of the bare fiber portion 1a of the optical fiber 1, and the outer diameter $D_{161}$ of the mold groove 161 is larger than the outer diameter $D_{162}$ of the sheath engaging groove 162.

More specifically, the length $L_{161}$ of the mold groove 161 is preferably in the range of 2–10 mm longer than the length $L_{1a}$ of the bare fiber portion 1a. It is also preferable that the outer diameter $D_{161}$ of the mold groove 161 is made in the range of 0.03–0.13 mm larger than the outer diameter $D_{162}$ of the sheath engaging groove 162.

Preferably, a tapered portion 161a consisting of a slanted surface may be provided to the edges of the mold groove 161 which is the boundary area between the mold groove 161 and engaging groove 162.

Recoating of the optical fiber is performed in the following manner in a recoating device according to the present invention that incorporates the molds 100A, 100B of the above-described design.

First, as shown in FIG. 1, the bare fiber portion 1a (includes cases where the coating is simply removed for whatever reason) of optical fiber 1, which was connected by heat fusion for example, is positioned inside the mold groove 161 of the lower mold 100A so that both ends thereof are uniformly separated from the groove edges without inclining toward either side. At the same time, the sheath 1b is tightly engaged inside the right and left sides of the sheath engaging groove 162. In this manner, positioning of the optical fiber 1 is performed.

Next, the upper mold 100B is positioned on top of the lower mold 100A. As a result, a cylindrical space for the recoated sheath is formed in between the mold grooves 161 of the molds 100A, 100B.

As described above, the length $L_{161}$ of the mold groove 161 is longer than the length $L_{1a}$ of the bare fiber portion 1a, and the outer diameter $D_{161}$ of the mold groove 161 is larger than the outer diameter $D_{162}$ of the sheath engaging groove 162. As a result, the aforementioned space between the mold grooves 161 is formed extending to the outer periphery of the sheath 1b positioned on the right and left of the bare fiber portion 1a.

In other words, as shown in FIG. 2, a ring-shaped clearance space $\delta$ is formed around the outer periphery of the sheath 1b.

Figure 5:
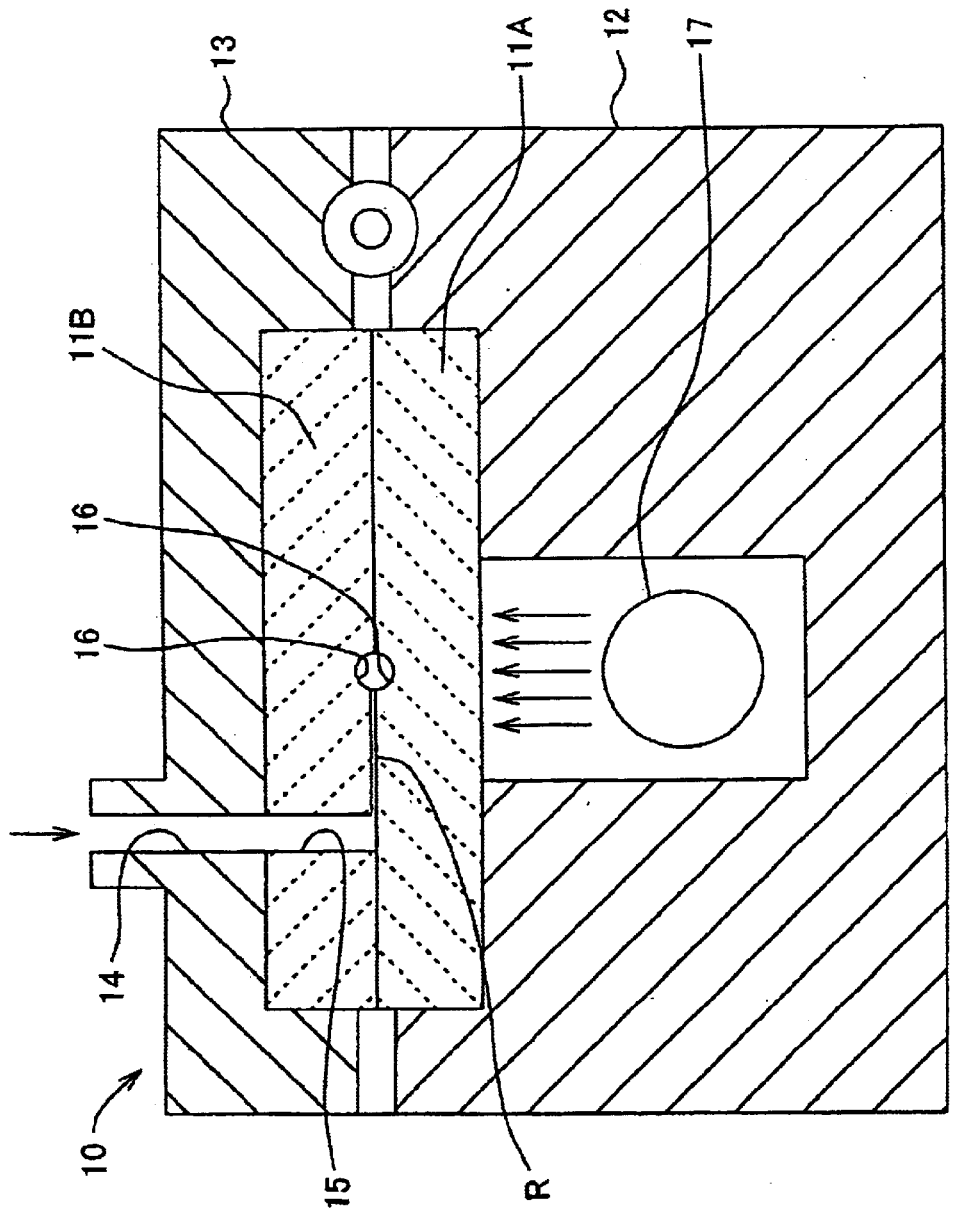
FIG. 5 is a view showing an example of a conventional optical fiber recoating device.
Figure 6:
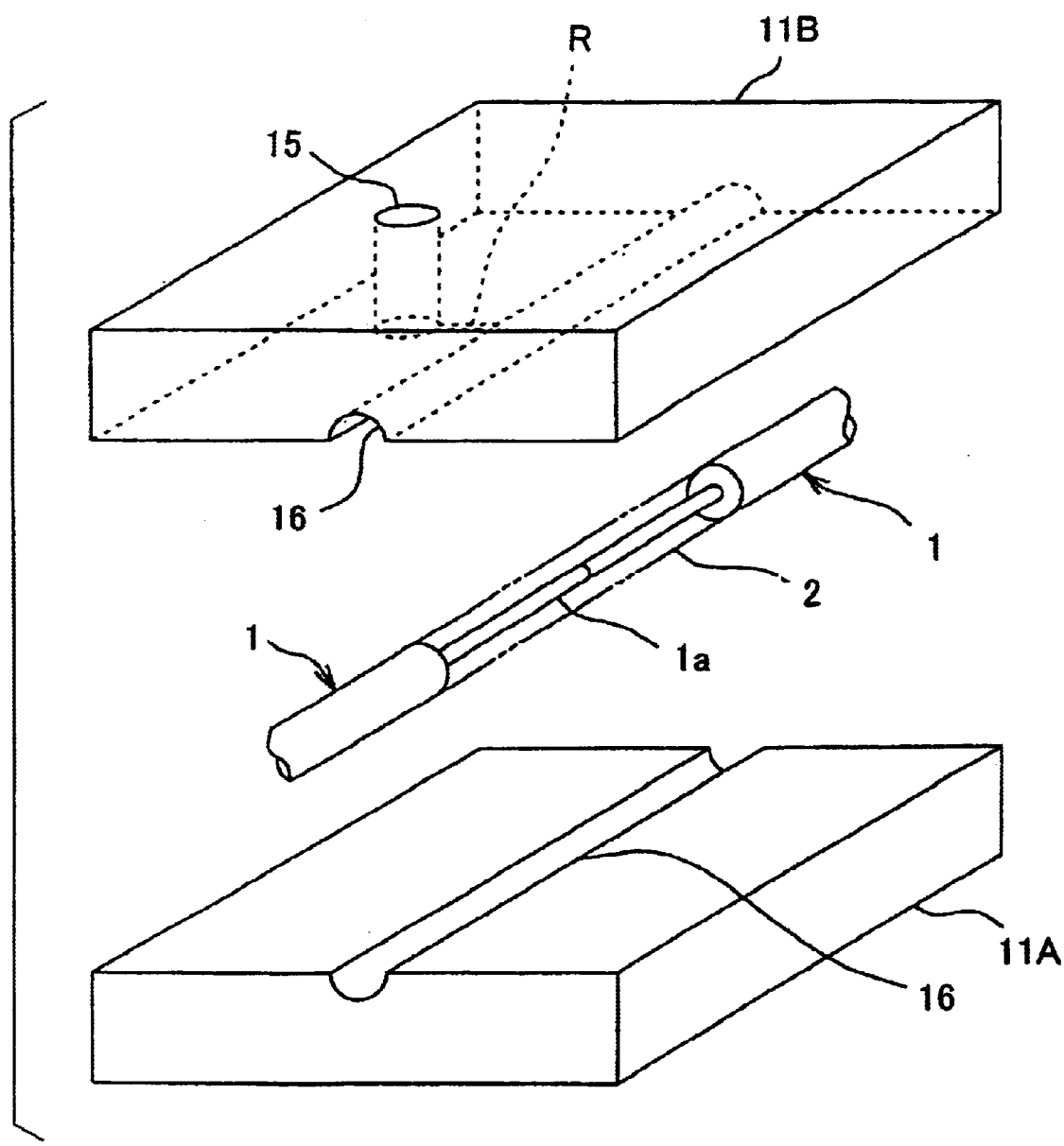
FIG. 6 is a schematic view showing the molds employed in the recoating device in FIG. 5.
Figure 7:
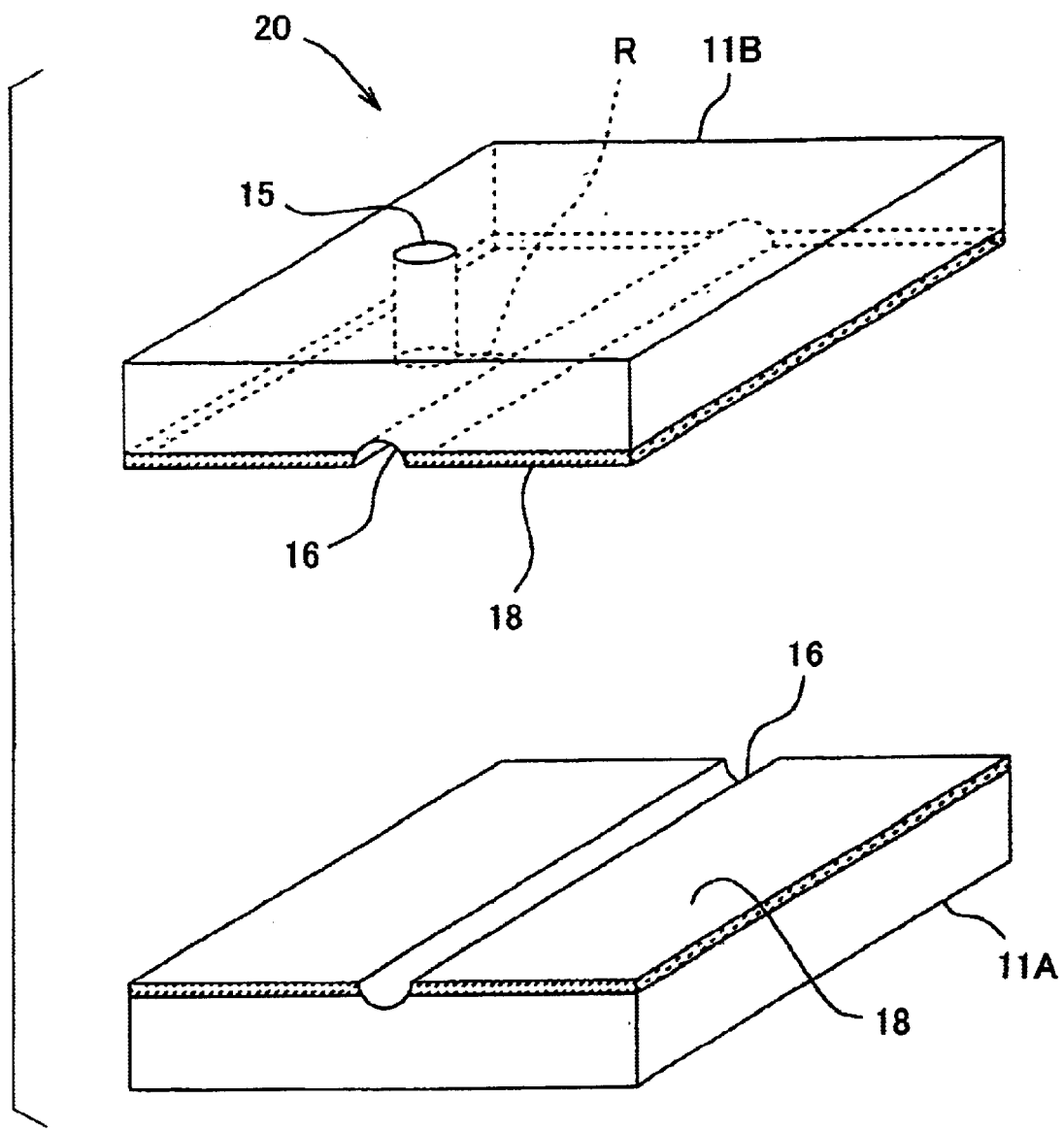
FIG. 7 is a schematic view showing another example of the molds employed in a conventional optical fiber recoating device.
Figure 8:
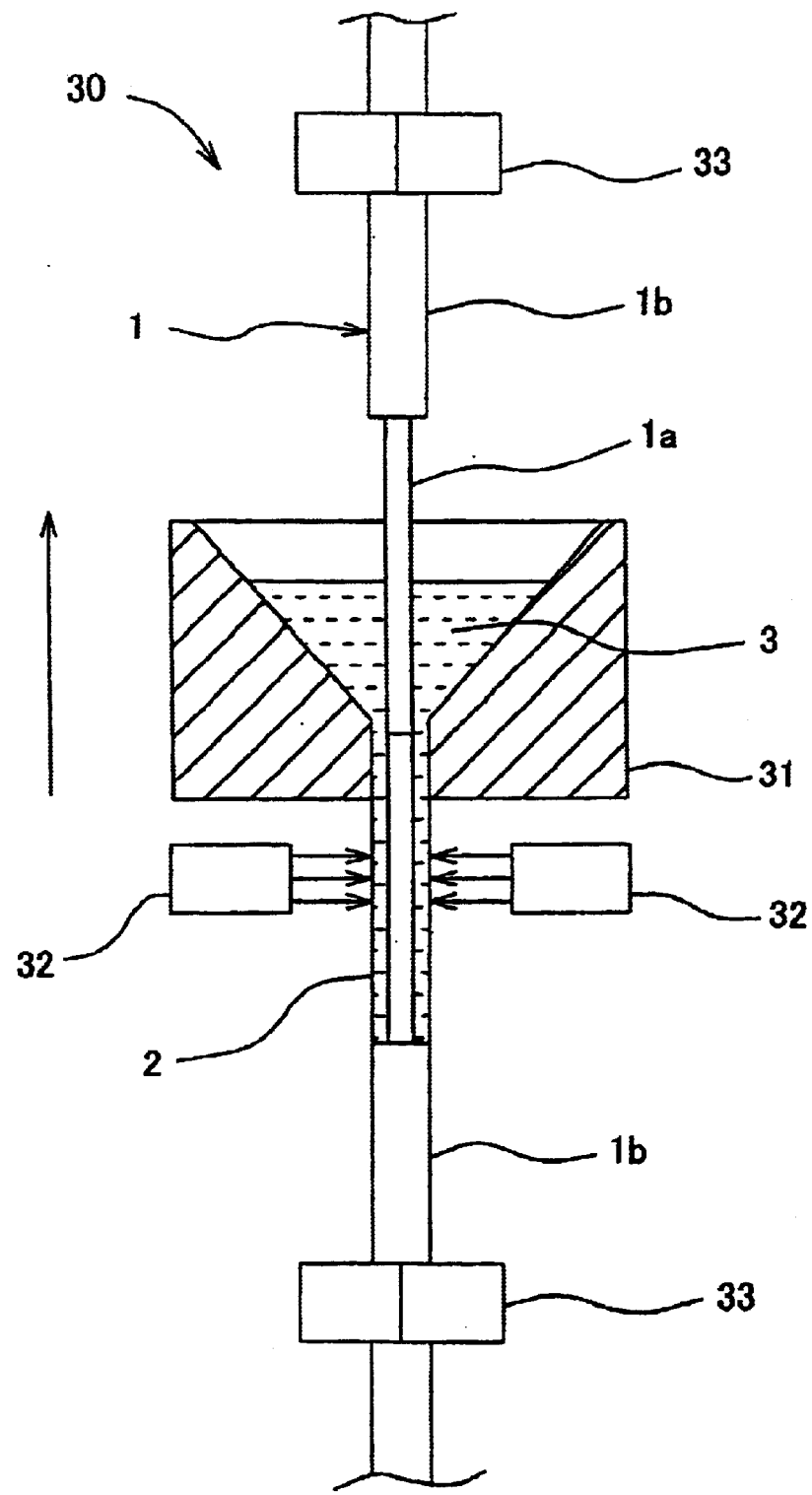
FIG. 8 is a view showing another example of a conventional optical fiber recoating device.
Figure 9:
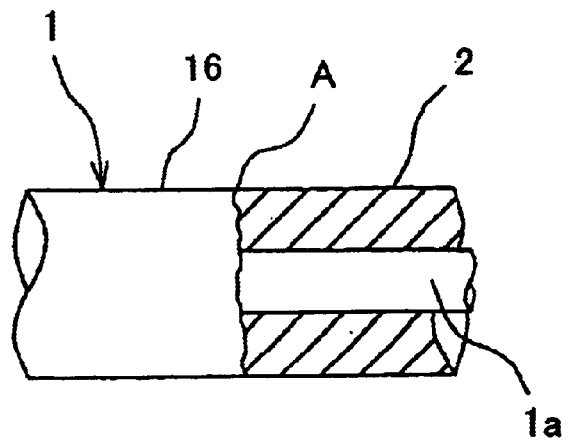
FIG. 9 is a component side view in vertical cross-section showing the recoated sheath in a conventional recoating device.
Figure 14:
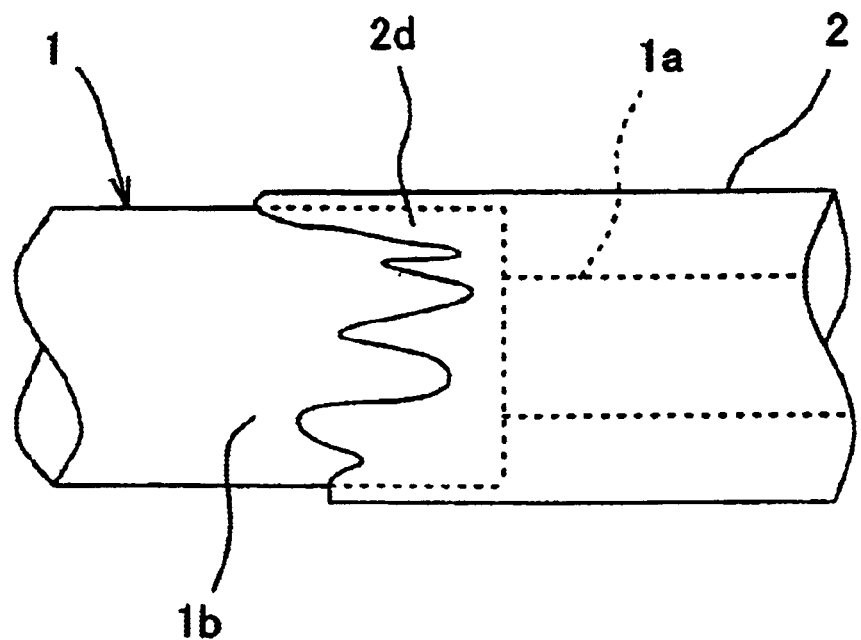
FIG. 14 is a side view showing the formed state of the recoated sheath in a conventional recoating device.
Figure 15:
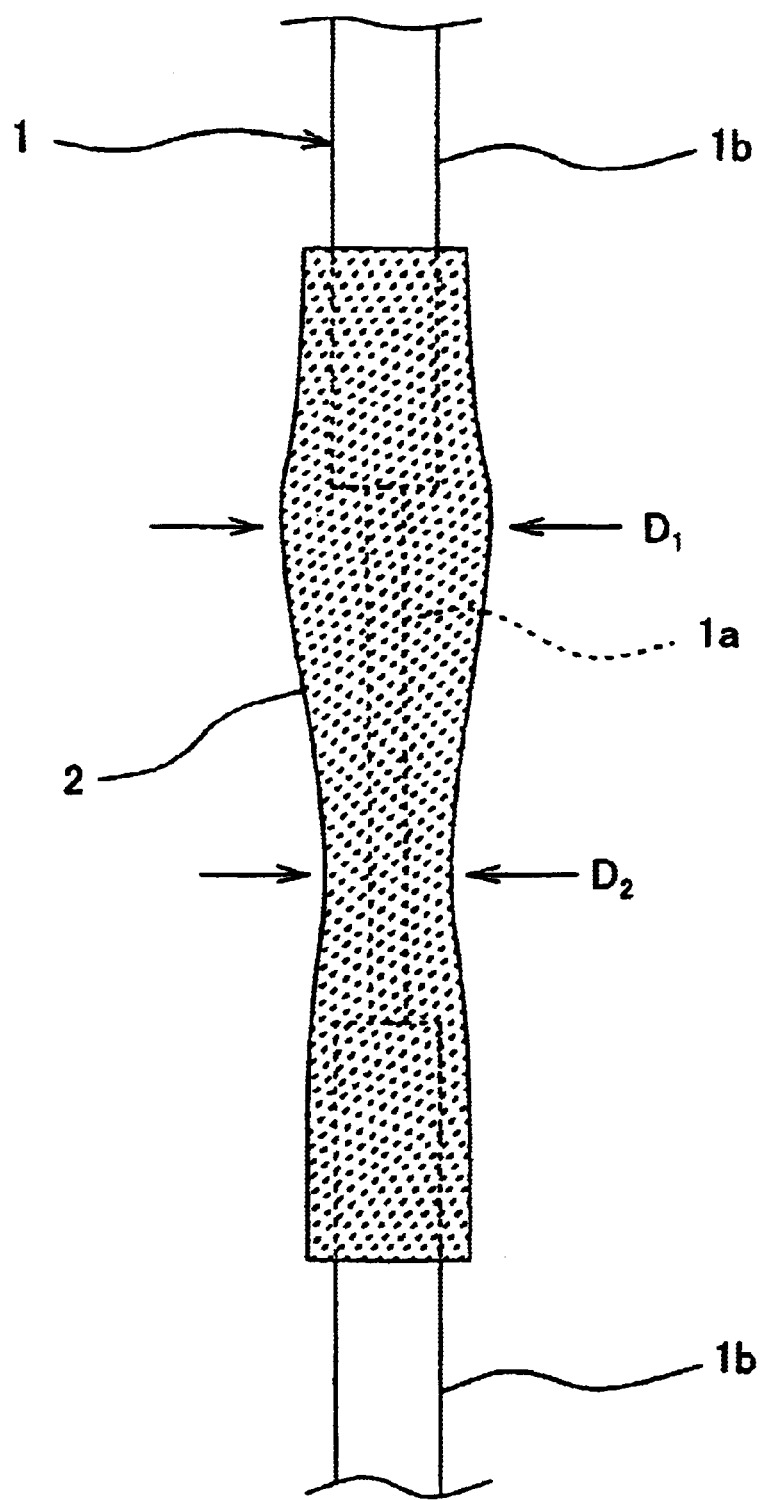
FIG. 15 is a view showing the recoated sheath in the recoating device shown in FIG. 8.

Furthermore, as in the case of the recoating device 10 in FIGS. 5 and 6, a recoating resin (UV curable resin) is filled into the cylindrical space formed by the respective mold grooves 161 of the molds 100A, 100B via the resin filling port 150 and the resin filling route R. The recoating resin of course fills the space around the outer periphery of the bare fiber portion 1a of the optical fiber 1 as a result, but also fills clearance space $\delta$ around the outer periphery of the sheath 1b. From the above-cited numerical data, a space for filling the resin has a length in the range of 2–10 mm and a width (thickness) in the range of 0.015–0.065 mm can be maintained as this clearance space $\delta$. Therefore, relatively large amount of resin can be filled in this clearance space $\delta$ compared to the amount of resin, such as shown in FIG. 14 for example, that leaks out from the outer periphery of the sheathed 1b which are tightly held in the groove.

Figure 3:
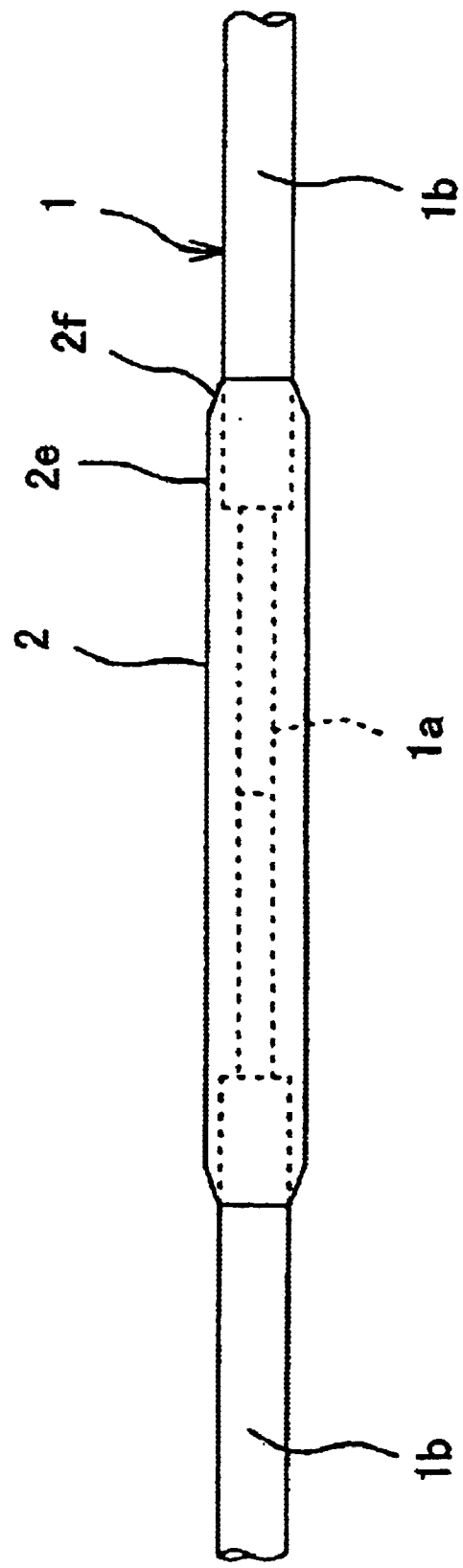
FIG. 3 is a view showing the recoated sheath of the optical fiber obtained using the optical fiber recoating device according to the present invention.

As in the case of recoating device 10 shown in FIGS. 5 and 6, after filling the resin, UV light is radiated from a resin curing means, such as a UV lamp, from below lower the mold 100A, for example. As a result, the recoated resin is quickly cured, to obtain the targeted recoated sheath 2 as shown in FIG. 3.

In this recoated sheath 2, the resin filled around the outer periphery of the bare fiber portion 1a of the optical fiber 1 which is filled relatively large amount since the diameter thereof is relatively larger, is cured to form a unitary structure with bare fiber portion 1a. Furthermore, the resin provided into the clearance space $\delta$ is cured to form a firm resin formed part (cylindrically shaped extending portion 2e) that extends over fiber sheathed portion 1b. As described above, the amount of the resin which is provided for this cylindrically shaped extending portion 2e is much greater than that of the resin simply leaking out. Moreover, this cylindrically shaped extending portion 2e is formed in a unitary manner connecting with the resin around the outer periphery of the bare fiber portion 1a. As a result, sufficient joining strength of the optical fiber 1 can be ensured.

Figure 10:
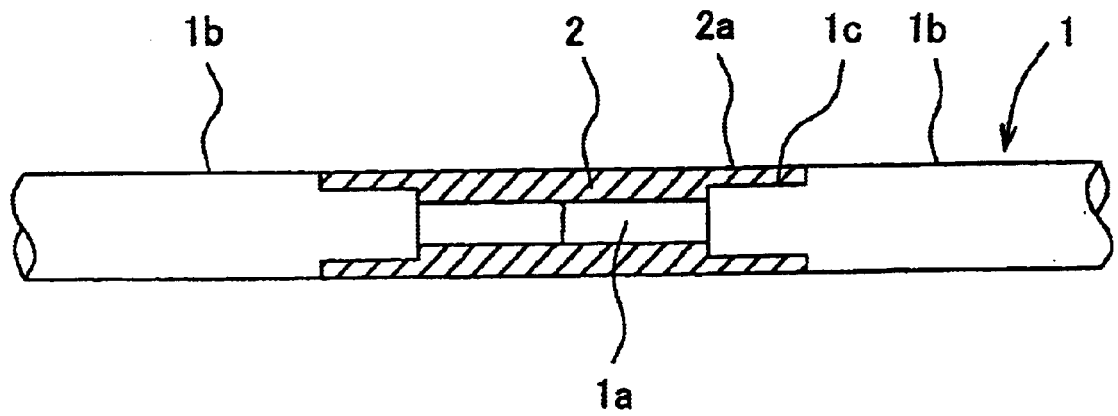
FIG. 10 is a component side view in vertical cross-section showing another example of the recoated sheathing in a conventional recoating device.
Figure 11:
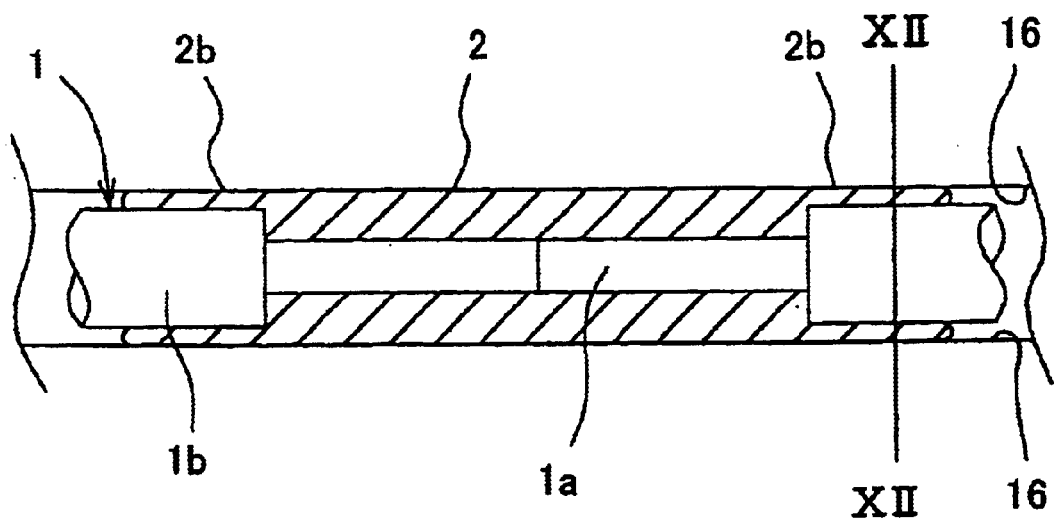
FIG. 11 is a component planar view in vertical cross-section view showing the formed state of the recoated sheath in a conventional recoating device.
Figure 12:
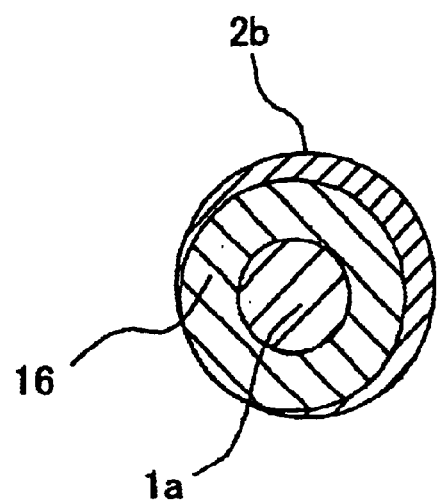
FIG. 12 is a view in vertical cross-section along the line XII—XII in FIG. 11.
Figure 13:
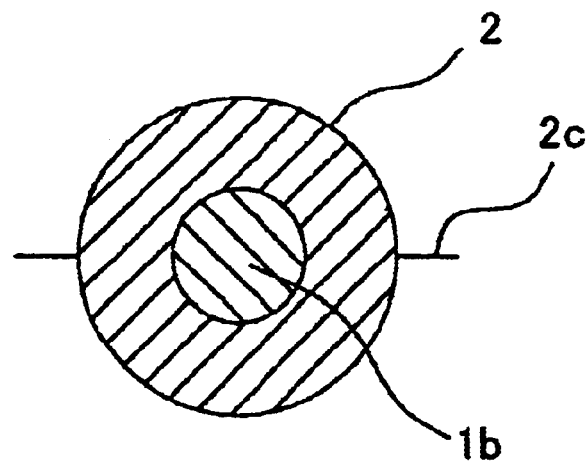
FIG. 13 is a view in vertical cross-section showing the formed state of the recoated sheath in a conventional recoating device.

In other words, by forming the cylindrically shaped extending portion 2e, joining strength roughly equivalent to that provided by the case shown in FIG. 10 in which the small diameter part 1c is provided to the conventional sheath 1b and the extending part 2a is formed to the recoated sheath 2, can be achieved in the present invention without performing any sort of procedure to the optical fiber 1.

Furthermore, by providing the tapered portion 161a to the mold groove 161, a sloped portion 2f can be formed to each edge of the cylindrically shaped extending portions 2e. As a result, a shock-absorbing effect with respect to external forces is obtained. Accordingly, effective resistance to cracking can be anticipated.

Figure 4:
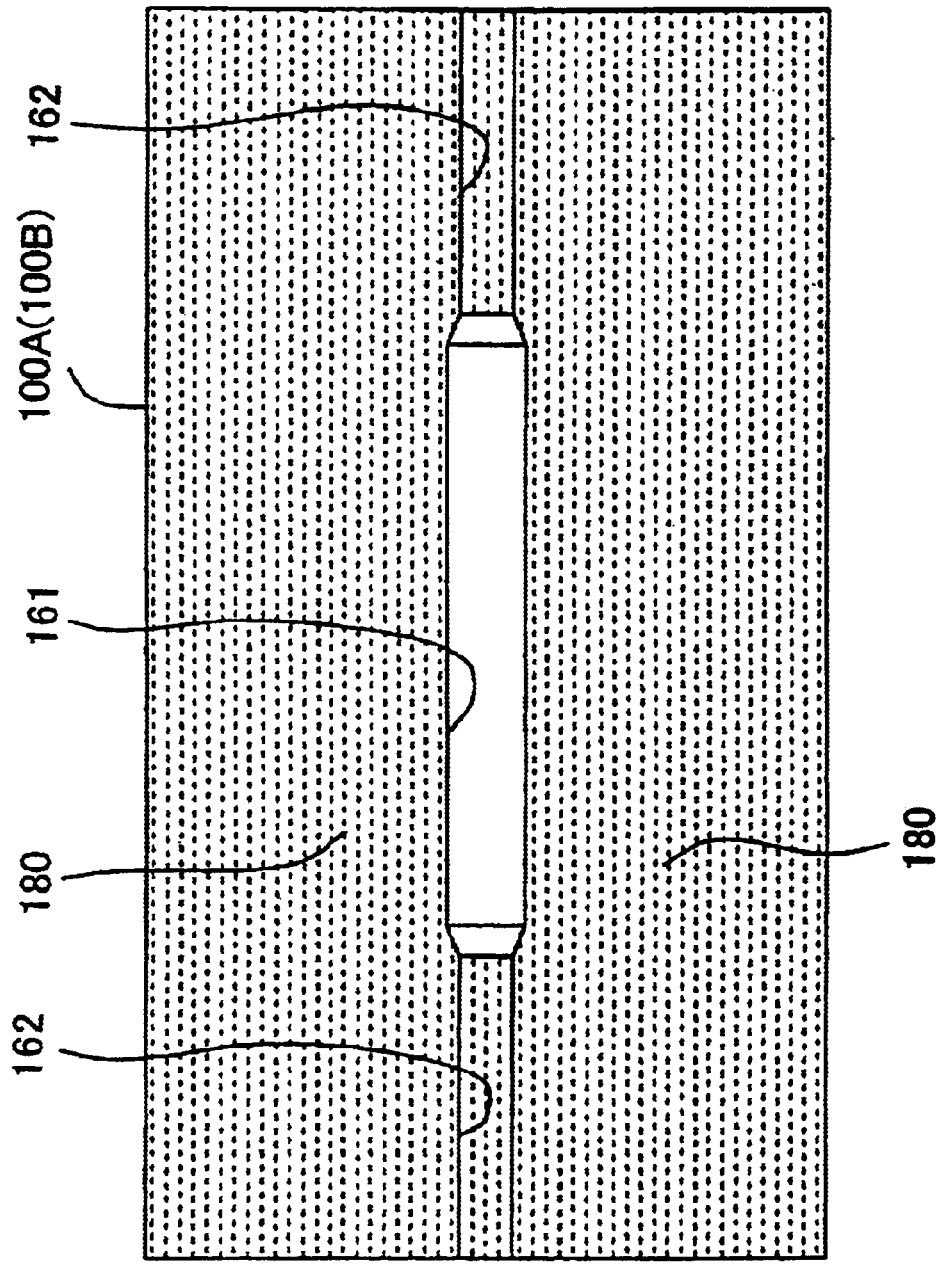
FIG. 4 is a view showing the abutting surfaces in another example of the molds employed in the optical fiber recoating device according to the present invention.

In order to limit generation of thin film projections (burrs) that are formed by resin that has leaked from the abutting surfaces of the molds 100A, 100B, a light blocking layer 180 may be provided to areas other than the mold grooves 161 of the molds 100A, 100B as shown in FIG. 4. Note that when the resin curing means such as the UV lamp is only provided on one side of the molds 100A, 100B, then it is acceptable to provide the light blocking layer 180 only to the side where the resin curing means is located.

In any case, when this type of light blocking layer 180 is provided, production of burrs from the whole abutting surfaces of the molds 100A, 100B can be prevented. In particular, light blocking layer 180 is also formed to the sheath engaging groove 162, so that generation of burrs from the ends of the sloped portion 2f of the cylindrically shaped extending portion 2e can be almost entirely prevented. As a result, the finished appearance of the sloped ends is clean, and excellent efficacy with respect to resistance to cracking can be anticipated.

Note that the preceding examples discussed the case where the transparent material of the molds is quartz glass, however, the present invention is not limited to this material.

As is clear from the preceding discussion, in the optical fiber recoating device of the present invention, a design is carried out to the mold grooves in the molds, i.e., the semicircular mold grooves are made longer than the bare fiber portion of the optical fiber, and the outer diameter of the mold grooves is made larger than the outer diameter of the fiber sheathed portion engaging groove that extends from the ends of these mold grooves. As a result, a recoated sheath is obtained that has sufficient joining strength.

Accordingly, a special work step to improve joining strength, such as providing a small diameter part to the sheath of the optical fiber, as in conventional devices, is completely unnecessary. Thus, there is no concern of reduced productivity in the present invention.

In addition, a simple solution is possible to ensure the joining strength of the recoated sheath, i.e., the length of the mold groove is simply made to be in the range of 2~10 mm longer than the bare fiber portion of the optical fiber, and the outer diameter of the mold groove is made to be in the range of 0.03~0.13 mm larger than the outer diameter of the sheath of the optical fiber.

What is claimed is:

1. An optical fiber recoating device for recoating a bare fiber portion of an optical fiber by filling a recoating resin into molds made of a light transmitting material, wherein:

semicircular mold grooves in said molds into which said recoating resin is filled are longer than said bare fiber portion of said optical fiber, and an outer diameter of said mold grooves is larger than an outer diameter of semicircular sheath engaging grooves that extend from either end of said mold grooves and engage a sheath of said optical fiber, and said molds have a layer of light blocking material in areas other than said mold grooves.

2. An optical fiber recoating device according to claim 1, wherein said mold grooves are in the range of 2–10 mm longer than said bare fiber portion of said optical fiber.

3. An optical fiber recoating device according to claim 1, wherein the outer diameter of said mold grooves are 0.03–0.13 mm larger than the outer diameter of said sheath of said optical fiber.

4. An optical fiber recoating device according to claim 2, wherein the outer diameter of said mold grooves are 0.03–0.13 mm larger than the outer diameter of said sheath of said optical fiber.

5. An optical fiber recoating device according to claim 1, wherein a tapered portion consisting of a slanted surface is provided to each edge of said mold grooves.

6. An optical fiber recoating device according to claim 2, wherein a tapered portion consisting of a slanted surface is provided to each edge of said mold grooves.

7. An optical fiber recoating device according to claim 3, wherein a tapered portion consisting of a slanted surface is provided to each edge of said mold grooves.

8. An optical fiber recoating device according to claim 4, wherein a tapered portion consisting of a slanted surface is provided to each edge of said mold grooves.

* * * * *